United States Patent [19]

Cane et al.

[11] Patent Number: 5,416,840
[45] Date of Patent: May 16, 1995

[54] SOFTWARE CATALOG ENCODING METHOD AND SYSTEM

[75] Inventors: David A. Cane, Sudbury; David S. Hirschman, Sharon, both of Mass.

[73] Assignee: Phoenix Technologies, Ltd., Norwood, Mass.

[21] Appl. No.: 87,924

[22] Filed: Jul. 6, 1993

[51] Int. Cl.⁶ .............................................. H04L 9/32
[52] U.S. Cl. .......................................... 380/4; 380/25
[58] Field of Search ...................................... 380/4, 25

[56] References Cited

U.S. PATENT DOCUMENTS

| | | | |
|---|---|---|---|
| 4,120,030 | 10/1978 | Johnstone | 380/4 |
| 4,168,396 | 9/1979 | Best | 380/4 |
| 4,278,837 | 7/1981 | Best | 380/4 |
| 4,405,829 | 9/1983 | Rivest et al. | 380/30 |
| 4,433,207 | 2/1984 | Best | 380/4 |
| 4,446,519 | 5/1984 | Thomas | 395/425 |
| 4,658,093 | 4/1987 | Hellman | 380/25 |
| 4,683,968 | 8/1987 | Appelbaum et al. | 380/4 |
| 4,685,055 | 8/1987 | Thomas | 380/4 |
| 4,757,534 | 7/1988 | Matyas et al. | 380/25 |
| 5,010,571 | 4/1991 | Katznelson | 380/4 |
| 5,081,676 | 1/1992 | Chou et al. | 380/4 |
| 5,199,066 | 3/1993 | Logan | 380/4 |
| 5,210,795 | 5/1993 | Lipner et al. | 380/23 |
| 5,319,705 | 6/1994 | Halter et al. | 342/4 |

OTHER PUBLICATIONS

Chaum, David, "Achieving Electronic Privacy", Scientific American, Aug. 1992, pp. 96–101.

*Primary Examiner*—Gilberto Barrón, Jr.
*Attorney, Agent, or Firm*—Stuart P. Meyer; Elizabeth F. Enayati

[57] ABSTRACT

A method and system for protecting computer program distribution within a broadcast medium involves encrypting at least a portion of the computer program $S_i$ using an encryption scheme keyed to both an encryption key $SK_i$ and a program identifier i. Each decryption device (PCDD) also has an associated identifier j. Two tables are generated and stored in a memory device: a first table, including correlations between the encryption key $SK_i$ and the program identifier i; and a second table, including correlations between the password key $PK_j$ and the hardware identifier j. A password $P_{ij}$ is generated based on both the encryption key $SK_i$ and a password key $PK_j$ is retrieved from these tables. The password $P_{ij}$ is transmitted to the user for subsequent use in decrypting the subject software program contained on the medium.

19 Claims, 8 Drawing Sheets

SOFTWARE CATALOG ENCODING METHOD AND SYSTEM

BACKGROUND OF THE INVENTION

1. Field of the Invention

The present invention generally relates to the field of software encryption, and specifically relates to protecting computer programs distributed using a broadcast media.

2. Brief Description of Background Art

Broadcast distribution of software, particularly software designed for personal computers, has introduced several problems of access and distribution control. For purposes of this discussion, the term "distribution" means distributing a large number of different software titles to a large number of potential customers without the ability to deliver different copies to each user. In addition to the usual mode of transmitting software on floppy diskettes, software may readily be transmitted via radio frequency public broadcast or computer network, each medium having the same problem of controlling access to the software thus transmitted.

The widespread use of CD-ROM with personal computers has provided an opportunity for a new model of retail software distribution. These disks have high capacity, typically equaling that of 400 floppy diskettes. The manufacturing cost of CD media is approximately equal to that of a single floppy diskette, thus allowing for low cost distribution of numerous different software products on a single CD.

However, CD-ROM distribution creates a problem of how to allow customers to pay only for those products that they wish to purchase, while preventing access to those products that physically are on the CD but have not been purchased. Encryption techniques offer a potential solution.

Encryption technology is a field that has been applied to software for decades. The problem addressed by most encryption systems is restriction of the ability to make copies of the subject software. Under such a scheme, the software is encrypted such that a copy of itself will not properly operate or the encryption in some way interferes with the proper functioning of a copy. One limitation of such a system is that an authorized user may desire to make back-up copies of the software, load it onto a computer internal memory, or otherwise make legitimate copies of the purchased software.

Some encryption systems, such as that disclosed in Thomas U.S. Pat. No. 4,446,519, integrate customized hardware that cooperates with the software. In that reference, an electronic security device (ESD) is attached to the computer, a software program provides a value that is sent to the device and processed, and the software checks for an expected response. Typically, the ESD is shipped with the software. Such a system only is directed to solving the problem of unauthorized copying of the software, not unauthorized access of distributed copies of the software.

In other systems, such as that disclosed in Matyas U.S. Pat. No. 4,757,534, each software medium containing the same program is different. That is, each floppy diskette containing the software has a unique diskette serial number. A password is given to the user to access the encrypted software. However, the password of Matyas is keyed to the unique medium, not to the software program itself. In addition, the Matyas system loads the decrypted data into a secure RAM. This addresses the problem of preventing unauthorized copying of the decrypted program. Such a scheme is not feasible in a broadcast distribution system in which it is cost-prohibitive if not impossible to assign a unique identification to each medium or where the software is broadcast over a network.

Thus, there remains a need for a method and system that allow the secure distribution of software on a broadcast medium, such as on CD-ROM or over a network. Such a method and system are needed to allow distribution of one or several computer programs, while allowing the publisher of the software to limit access to selected ones of the programs using the existing base of personal computers and personal computer designs.

SUMMARY OF THE INVENTION

The present invention is a method and system for protecting computer program distribution in a broadcast medium. The method involves encrypting at least a portion of the computer program $S_i$ using an encryption scheme keyed to both an encryption key $SK_i$ and a program identifier i.

All encrypted programs are stored on a broadcast medium, such as a CD-ROM. A catalog of programs contained on the medium may also be included. Each stored encrypted program $S_i^E$ has an associated identifier i that may be used to identify a selected program on the medium. The system includes a decryption device (PCDD) $H_j$, which has an associated unique identifier j.

Two tables are generated and stored in a memory device: a first table, including correlations between the encryption key $SK_i$ and the program identifier i; and a second table, including correlations between a password key $PK_j$ and the hardware identifier j. Once a user selects a particular software program $S_i^E$ from the medium, two pieces of information are used to permit access to the entire selected program: the program identifier i; and the hardware identifier j. Typically, some form or promise of payment for the subject software also is transmitted by the user to an order center or other control center at which the two tables are maintained.

The user-transmitted program identifier i is used to access the software encryption key $SK_i$ from the first table, and the user-transmitted hardware identifier j is used to access the password key $PK_j$ from the second table. A password $P_{ij}$ is generated based on both the encryption key $SK_i$ and the password key $PK_j$. The password $P_{ij}$ is transmitted to the user for subsequent use in decrypting the selected software program $S_i$ contained on the medium.

Typically, the password $P_{ij}$ is stored in an order file or other storage location in communication with the PC decryption device PCDD. The PCDD includes the stored password key $PK_j$. The PCDD decrypts the password $P_{ij}$ using the stored password key $PK_j$ obtained as described above, and recovers the software encryption key $SK_i$. The key $SK_i$ is presented to a decryption block at which the subject software is decrypted for access by the user. Typically, the tables are stored in a location remote from the PCDD to prevent unauthorized access to the keys.

The present invention is described in further detail below with respect to the figures, detailed description, and claims.

DETAILED DESCRIPTION OF THE PREFERRED EMBODIMENT

The present invention relates to a method and system for limited broadcast distribution of personal computer software. Basically, many software titles may be provided to a large number of users via broadcast media, such as on CD-ROM or over a network. The specific distribution system is not significant for the implementation of the present invention.

Software programs contained on the medium are "locked" using any available encryption scheme to prevent the CD-ROM user from either complete or partial access to each software program contained on the medium. It may be desirable to encrypt all but a portion of the software to allow a user to peruse the software before considering a purchase of a complete working copy. Upon payment of a fee, or upon satisfying any other criteria as required by the software publisher, the user is given a password that will unlock the software on the medium for installation and use.

To achieve the desired high level of security for such a system, it is necessary that the password given to one user for a given program be different from the password given to another user for that same program. Thus, all copies of the software may be encrypted using a single encryption scheme, stored or transmitted over media that does not need to be uniquely identified, yet only an authorized user may access a complete working copy of that software. This would prevent a user from passing on the CD to other users, together with a password, for unlimited access. It is also important that the key used to encrypt the subject program be hidden from the user during the decryption process to prevent a user from determining the password generation scheme.

The main focus of the present invention is to provide limited access to selected software transmitted to users on an unsecured, non-unique medium. The definition of a security breach in the present context differs from the usual problem of secure communication of data. One difference being that copies of the unlocked software under the present invention may be available from any retail store. That is, the software available on the media may be any commercially available software. Thus, the primary focus of the present invention is preventing a user from breaking into a particular distribution system.

In addressing these issues, the present invention involves the use of a personal computer decryption device (PCDD) $H_j$ intended to work in conjunction with an overall broadcast software distribution scheme for personal computer software. The PCDD provides a secure means of converting passwords into keys for unlocking the data. An example may be DES or a cipher stream decryption method, or any other method known to those skilled in the art. In the software distribution application, the PCDD is intended only to be used to decrypt software files that were previously encrypted before being published in the medium.

Figure 1:
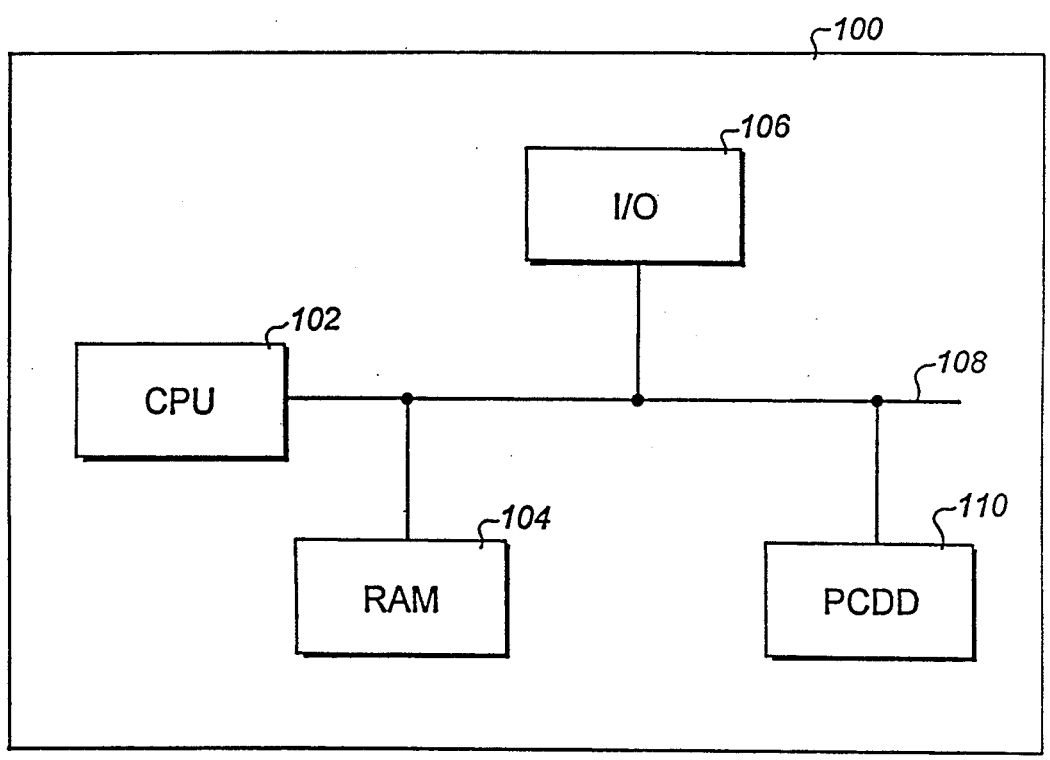
FIG. 1 is a block diagram showing the hardware environment of the personal computer decryption device PCDD 110 of the present inventive system.

FIG. 1 shows how the PCDD 110 fits into the overall architecture of a computer 100. Typically, the computer 100 includes a processor 102, memory 104 which may be RAM, and various I/O devices 106 of which the PCDD 110 may be one. The diagram of FIG. 1 illustrates the PCDD 110 as an I/O device connected to a bus 108.

Figure 2:
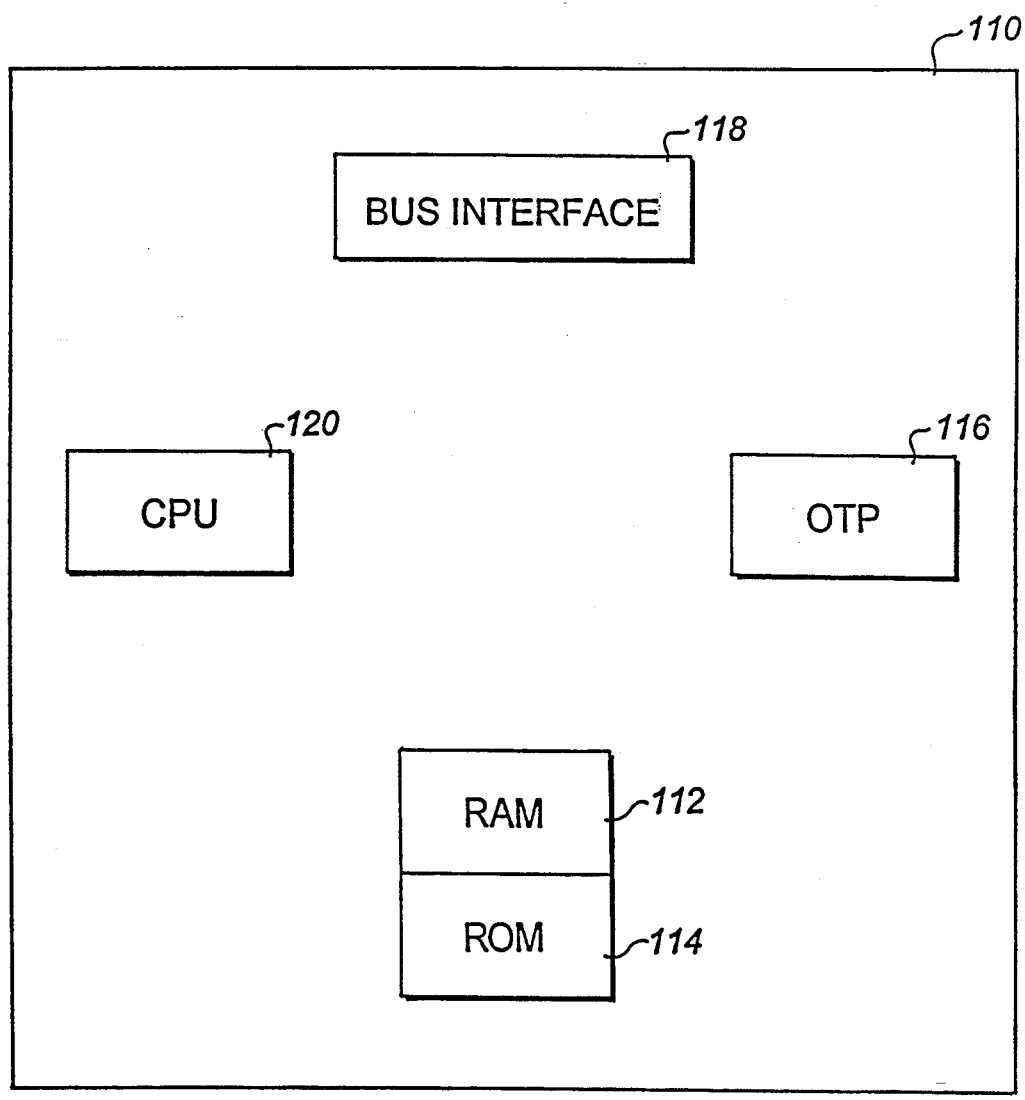
FIG. 2 is a block diagram showing the PCDD 110 of the present inventive system.

As shown in FIG. 2, the PCDD 110 includes ROM 112, RAM 114, at least one one-time programmable ROM 116 (OTP), and a bus interface 118, as well as a processor 120. The OTP 116 is used to hold the hardware identifier j and the password key $PK_j$. Each PCDD 110 is assigned a unique identifier j that can be read by the host processor 102 and a password key $PK_j$ that cannot be read by the host processor 102. In a preferred embodiment, the password keys $PK_j$ are assigned using a random number generator and bear no algorithmic relationship to the hardware identifier j.

In a preferred embodiment, the PCDD 110 performs two basic functions. The first function involves converting a password $P_{ij}$, which is specific to both the software $S_i$ being accessed and the computer system on which the program will run, as related to the decryption device PCDD with which the software will be unlocked, to a software decrypting key $SK_i$. This function may be defined as $F^{-1}$(Password $P_{ij}$, Password Key $PK_j$). The second function unlocks, or decrypts, the software $S_i^E$ using the software key $SK_i$.

The ROM 112 contains the code used by the processor 120 to execute the decryption algorithms $D_n$ that are accessed to decrypt the subject software. The RAM 114 is used in the process of executing those algorithms $D_n$.

In a preferred embodiment of the PCDD 110, the OTP 116 includes twelve bytes programmed prior to insertion of the ROM onto a printed circuit card. A four byte serial number j is programmed into each chip and an eight byte password key $PK_j$ is programmed into each chip. The chip preferably contains an eight bit microcomputer that executes two cryptographic algorithms. There is an eight bit PC/XT I/O mapped bus interface.

Figure 3:
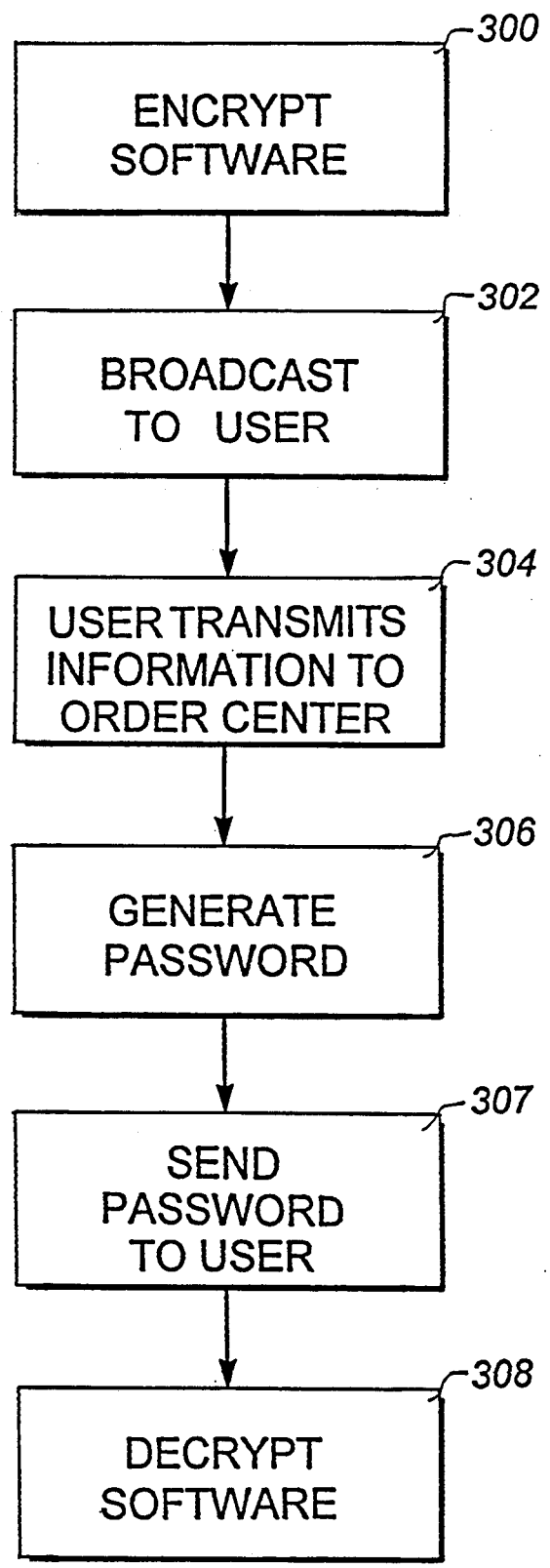
FIG. 3 is a flow diagram showing an embodiment of the present inventive method.

Turning now to the inventive method, FIG. 3 shows a simple flow diagram of an implementation of the PCDD 110. In that illustrated embodiment, the subject software may be encrypted 300 using an encryption scheme that depends on the software program identification and an encryption key. The encryption may be performed by the software vendor or developer.

The encrypted software is broadcast 302 to a user on some broadcast medium, such as over a wired or wireless network or on a CD-ROM. The broadcasting 302 may be performed by a publishing center that is separate from the software vendor, or may be performed by the software developer. The CD may contain one software program or multiple software programs for review. In each instance, a portion of the software may be left unencrypted for user access and review. The medium may also contain a catalog of software titles contained on the medium, together with a listing of software identifiers for reference by the user.

Once a user has selected a particular software title for purchase, the user transmits 304 the hardware identifier, software program identifier, and preferably some form of payment or promise of payment to an order center. The order center receives the information from the user, and generates 306 a password that then is transmitted 307 to the user. The method for generating the password is described in further detail below.

Once the user receives the password from the order center, it may be used to decrypt 308 the subject software using the decryption algorithms in the PCDD 110. The software may be further encrypted or other copy protected to prevent subsequent impermissible copying of the program. Any such schemes available to those skilled in the art may be used in conjunction with the present method and system to achieve this type of security for the program. One such scheme is described in further detail below.

Figure 4:
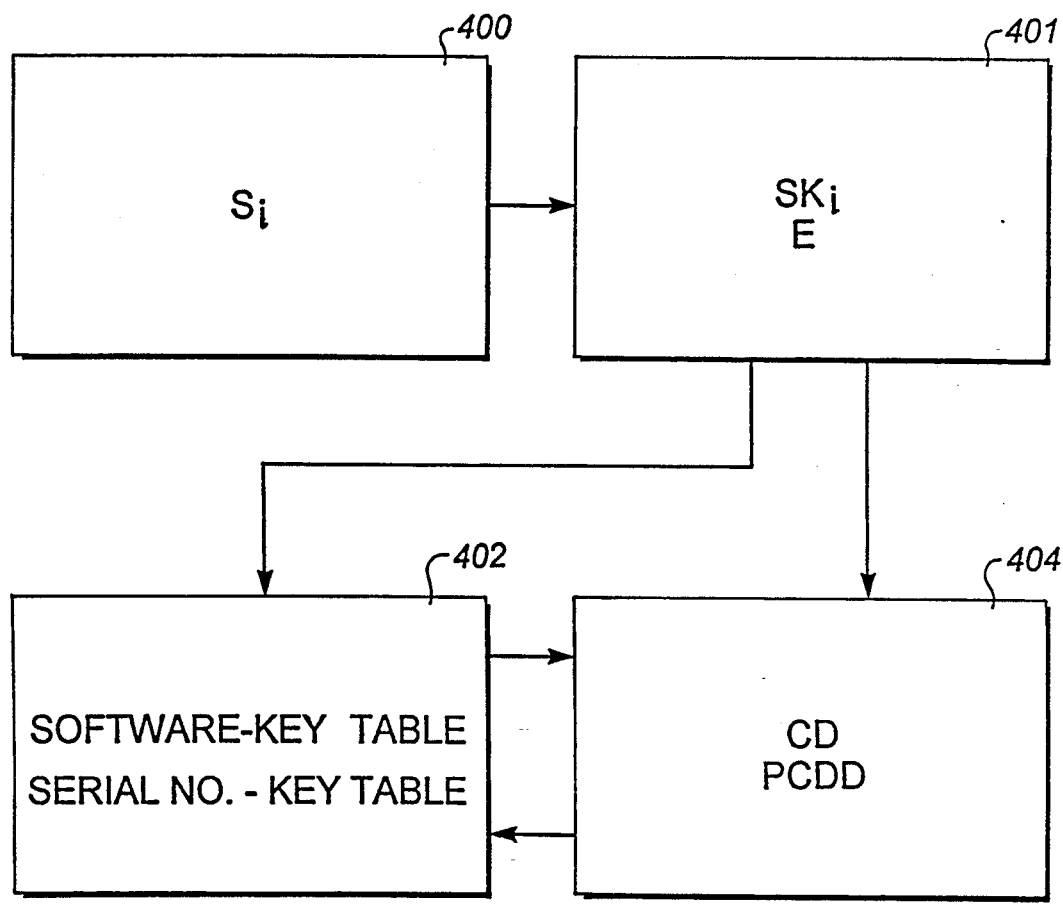
FIG. 4 is a flow diagram showing a preferred environment in which the present invention may be used.

FIG. 4 shows a flow diagram of a preferred environment in which the present invention may be used. A software vendor 400 provides encrypted software $S_i^E$ to a publishing center 401. The publishing center 401 produces and distributes the encrypted software $S_i^E$ to users 404 using any of the various available forms of broadcast media. The publishing center 401 also transmits an encryption key $SK_i$ and software identifier i information to the order center 402 which maintains a software-encryption key table and a hardware-password key table, as described in further detail below. The encryption key $SK_i$ may be supplied to the publishing center 401 by the software vendor 400 or be generated at the publishing center 401, depending on the particular arrangement between centers. The hardware identifier j and password key $PK_j$ are obtained by order center 402 from the center at which PCDD 110 is originally programmed. After reviewing the software $S_i$ on the medium, a user 404 may select one or more of the software products $S_i$ from the media and transmit order information to an order center 402. The order center 402 processes the order and sends a password $P_{ij}$, generated based on the two tables, to the user 404 to enable the decryption and access to the subject software.

Figure 5A:
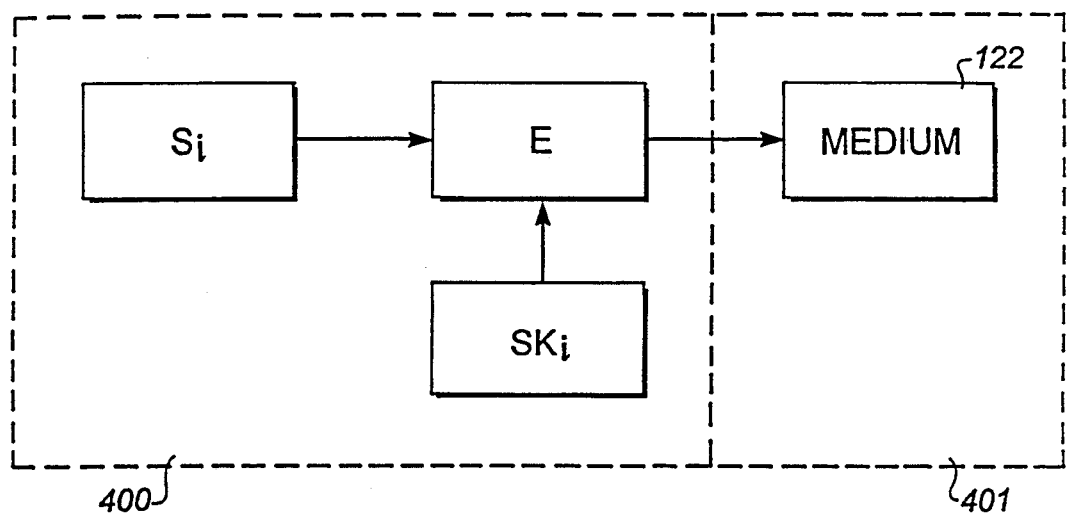
FIGS. 5A-5D are a flow diagram showing more detail of the embodiment of FIG. 3.

Turning now to FIG. 5A, a partial flow diagram shows the preliminary steps that preferably occur at the location of the software vendor 400 and the publishing center 401. The software vendor 400 encrypts each of their n number of software products $S_i$ with an encryption algorithm E. The encryption algorithm E encrypts the software $S_i$ using the unique software encryption key $SK_i$ in accordance with the algorithm:

$$S_i^E = E(S_i, SK_i)$$

The exact nature of the encryption algorithm E is unimportant, as long as it includes the property that, given both the unencrypted and encrypted data, it is not practical to compute the encryption key $SK_i$. A large collection of such algorithms are available in the industry, including DES.

All encrypted programs are placed on a storage medium 122, such as a single CD-ROM or stored in a buffer for retrieval and/or transmission. The medium 122 may be distributed by a publishing center 401, which may append a catalog of available software or other information on the medium. Distribution may include transmission on a CD-ROM via mail, radio transmission, transmission across a wired or wireless network, and the like. Any secured or unsecured media appropriate for software data may be used.

Figure 5B:
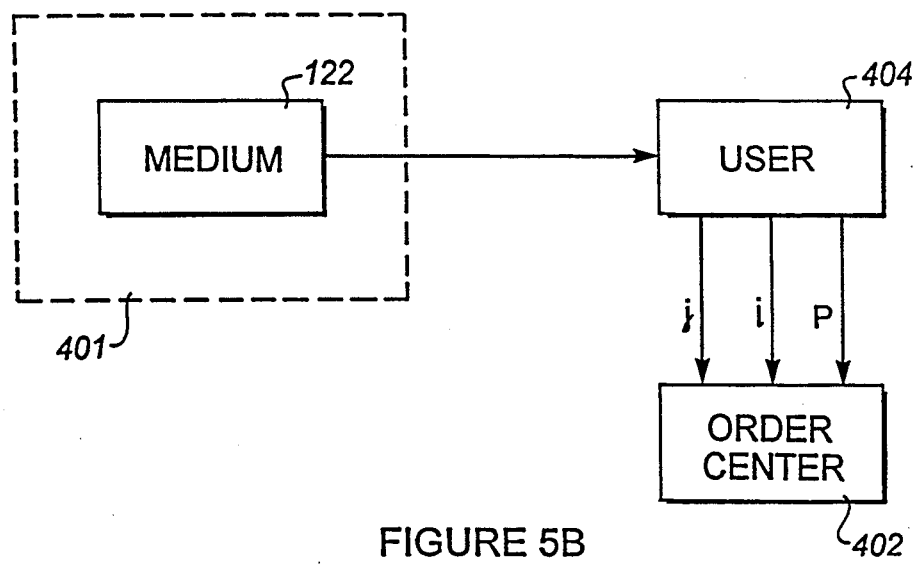

Turning now to FIG. 5B, once a user 404 receives the medium 122, the information contained on the medium 122 may be loaded onto a computer system to allow review of the encrypted software $S_i^E$. As previously mentioned, the software preferably is partially encrypted to permit limited access to program by the user 404. Once a user 404 decides to order a program $S_i^E$, several pieces of information are transmitted to an order center 402: the hardware identifier j (or serial number) of the hardware decryption facility PCDD 110; the software identifier i of the software the user 404 wishes to purchase $S_i^E$; and payment authorization or promise to pay P.

Figure 5C:
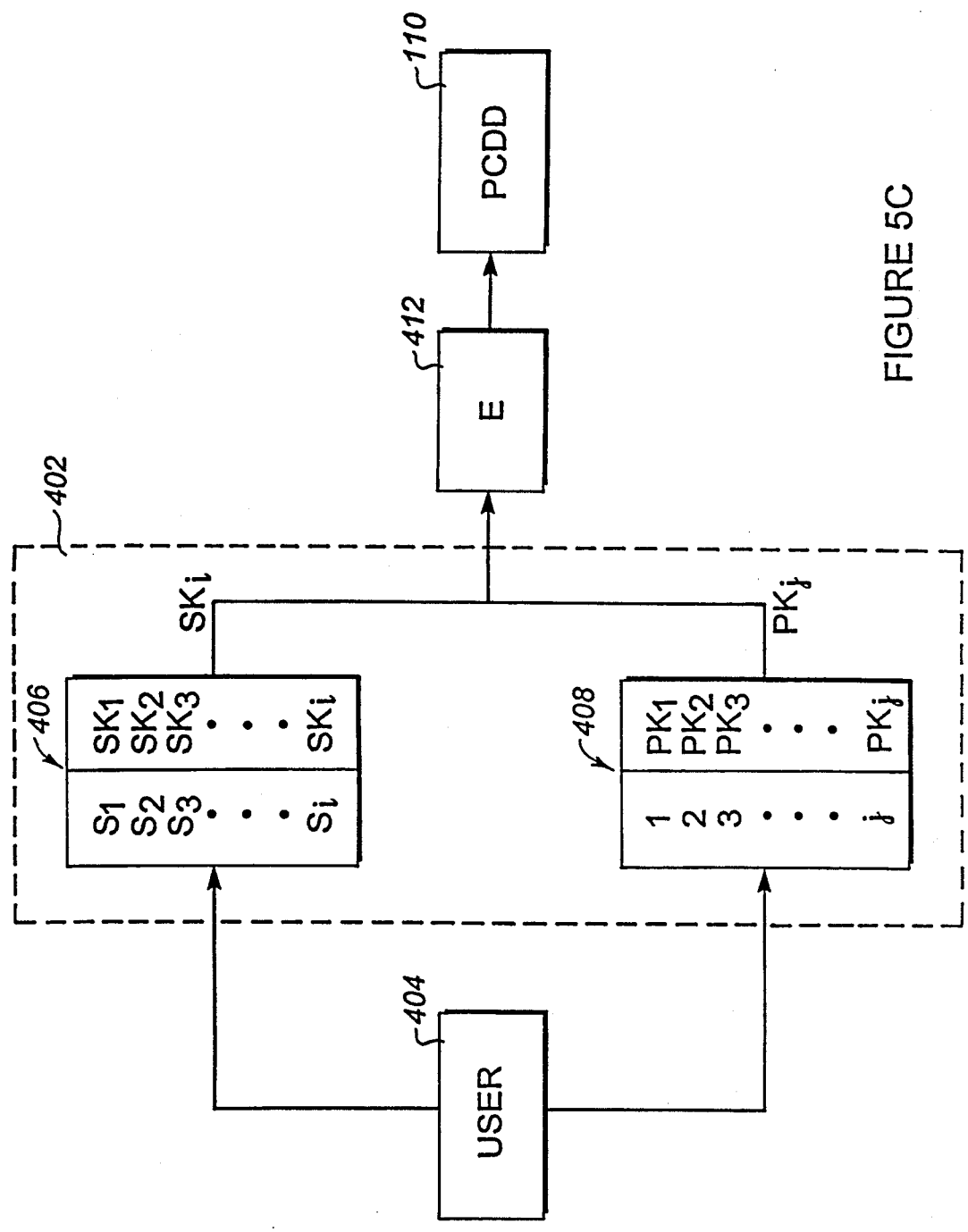

FIG. 5C shows the flow of information at an order center 402. The order center 402 stores and maintains two correspondence tables: a software identifier i-to-software encryption key $SK_i$ table (Software-Key table) 406; and a hardware identifier j-to-password key $PK_j$ table (Serial Number-Key table) 408. Preferably, table 406 is generated at the order center 402 and table 408 is generated at the location at which the PCDD 110 is originally programmed. Once the order center 402 receives the hardware identifier j and software identifier i, the program identifier i may be used as an index to the Software-Key table 406 to determine the software encryption key $SK_i$ that was used to encrypt the subject program $S_i^E$. The hardware identifier j may be used to index the Serial Number-Key table 408 to determine the hidden password key $PK_j$. A password $P_{ij}$ is generated using both the encryption key $SK_i$ and the password key $PK_j$, through encryption block 412, preferably in accordance with the algorithm:

$$P_{ij} = F(SK_i, PK_j)$$

wherein F is a reversible function. The password, $P_{ij}$, preferably is not arithmetically computable from j, to further protect the password $P_{ij}$ from being determined by a user. Once generated, the password $P_{ij}$ is transmitted to the user 404 where it may be stored. Preferably, the password $P_{ij}$ is stored in an order file 410 or other file accessible by the PCDD 110.

Figure 5D:
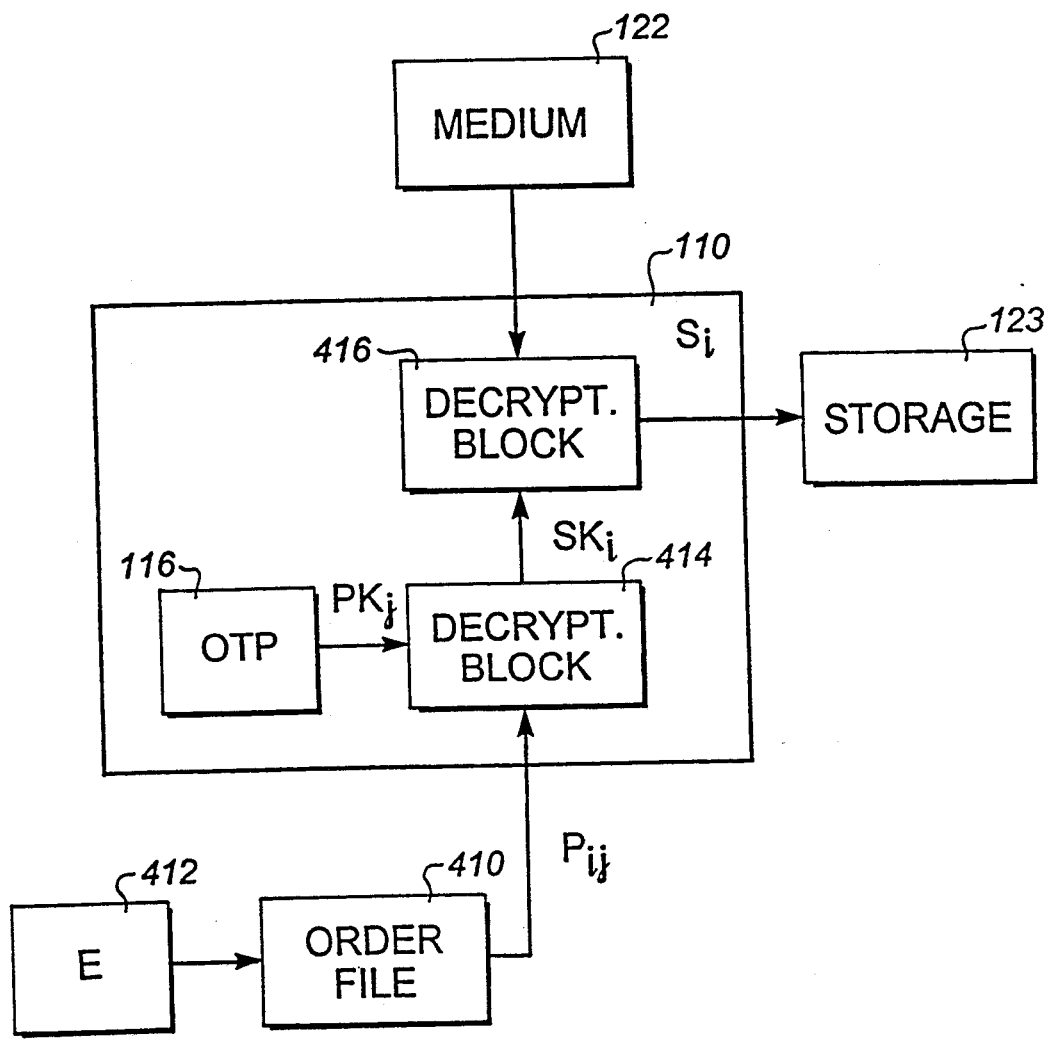

FIG. 5D is a continuation of the flow chart of FIGS. 5A–5C, showing the steps involved in decrypting the subject software $S_i^E$ using the received password $P_{ij}$. The password $P_{ij}$ is loaded from the order file 410 to the PCDD 110. This device 110 decrypts the password $P_{ij}$ using the password key $PK_j$ that is stored within the OTP 116 and which functions as an input to decryption block 414. This decryption action recovers the software key $SK_i$ from block 414 which key is then presented to decryption block 416. This block 416 is then used to decrypt the encrypted software product $S_i^E$ from the medium 122, allowing the software $S_i$ to be loaded either into some storage media 123, such as RAM for immediate execution or to a disk for later use.

After the software $S_i$ is decrypted, it may be possible to include a system for preventing unauthorized access to the software $S_i$. Such a system may be one generally commercially available, or may include the following scheme, as illustrated in FIG. 6.

Figure 6:
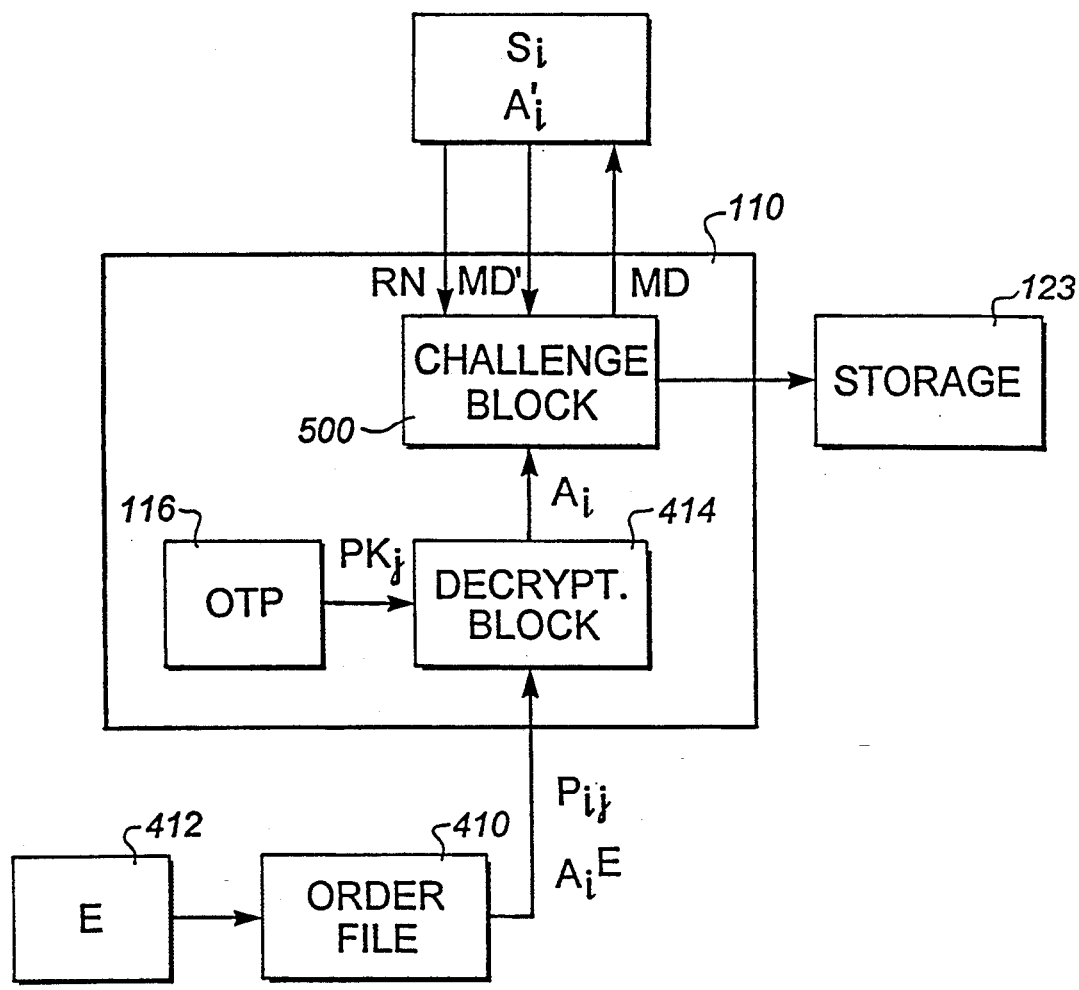
FIG. 6 is a flow diagram showing a preferred embodiment of a method for preventing copying of the software decrypted in accordance with the present invention.

The illustrated security system of FIG. 6 involves adding an authorization code $A_i$ to the Software-Key table 406'. Thus, there is an authorization code $A_i$ for each software program $S_i$ as well as the associated software key $SK_i$. When an order is processed, $A_i$ is encrypted using the same encryption block 412 and password key $PK_j$ as described above. The password $P_{ij}$ and an encrypted authorization code $A_i^E$ are sent to the PCDD 110, which includes a challenge function block 500. As illustrated, the password key $PK_j$ is stored in the OTP 116, and the encrypted authorization code $A_i^E$ is stored in a storage medium 410, such as the order file described above.

A decryption block 414 decrypts the encrypted authorization code $A_i^E$, using the password key $PK_j$ retrieved from the storage medium 116. The decrypted authorization code $A_i$ then is sent to a challenge block 500 which generates a message digest MD that is used to authorize the running of the previously decrypted software.

In the illustrated embodiment, the software $S_i$ includes a function that generates a unique identifier RN, such as a random number, associated with the software and an authorization code $A_i'$ that is associated with the software $S_i$. This unique identifier RN may change each time the program is run or otherwise request an authorization to run. However, in some instances it may be possible to use the same software identifier i both during decryption of the software and for authorizing running of the program.

In practicing the illustrated system, the challenge block 500 performs some function, such as a non-reversible computation, of RN and the authorization code $A_i$ to determine a message digest MD. This message digest may then be sent to the software $S_i$ for collaboration.

The software $S_i$ then performs the same function, as performed in the challenge block 500, of RN and the authorization code $A_i'$ to generate a second message digest MD'. The second message digest MD' then is compared by the software to the MD generated by the challenge block 500. A successful comparison signifies authorization of the program to run.

What is claimed is:

1. A method for protecting computer program distribution within a broadcast medium that is operable on a computer using a decryption device having a unique hardware identifier j, comprising the steps of:

A. encrypting at least a portion of the computer program $S_i$, the program having an associated computer program identifier i, in accordance with the formula:

$$S_i^E = E(S_i, SK_i)$$

wherein E is an encryption algorithm and $Sk_i$ is a software encryption key;

B. securing the software encryption key $SK_i$ against unauthorized access;

C. generating a first table representative of correspondences between the software encryption key $SK_i$ and the computer program identifier i;

D. generating a second table representative of correspondences between the hardware identifier j and a password key $PK_j$;

E. selecting from the first and second tables the password key $PK_j$ and software encryption key $SK_i$ responsive to receipt of the hardware identifier j and computer program identifier i;

F. generating a password $P_{ij}$ in accordance with the formula:

$$P_{ij} = F(SK_i, PK_j)$$

wherein F is a reversible function; and

G. issuing the password $P_{ij}$ to enable operation of the encrypted portion of the computer program.

2. The method of claim 1, wherein Step D comprises the steps of:

using the program identifier i as an index to the first table to determine the corresponding encryption key $SK_i$; and using the hardware identifier j as an index to the second table to determine the corresponding password key $PK_j$.

3. The method of claim 1, further comprising randomly generating the password key $PK_j$.

4. The method of claim 1, further comprising the step of, after Step A, storing the computer program $S_i^E$ on the broadcast medium.

5. The method of claim 4, further comprising the step of storing a catalog file, including a list of stored programs, on the broadcast medium.

6. The method of claim 1, further comprising:

(i) generating an encrypted authorization code $A_i^E$ using an algorithm related to the hardware identifier j, and storing the authorization code $A_i^E$ in a storage medium;

(ii) generating a unique identifier RN associated with the software $S_i$, the computer program $S_i$ including an associated authorization code $A_i'$;

(iii) decrypting the stored authorization code using the password key $PK_j$ to generate a decrypted authorization code $A_i$;

(iv) generating a first message digest MD using the unique identifier RN and the decrypted authorization code $A_i$;

(v) generating a second message digest MD', associated with the computer program $S_i$, using the unique identifier RN and the authorization code $A_i'$;

(vi) comparing MD and MD' to identify a positive correlation between MD and MD'; and (vii) enabling operation of the computer program $S_i$ in response to a positive correlation between MD and MD'.

7. A computer-implemented method for providing authorization to a user at a first location from a second location for access to an application program $S_i$, having an associated program identifier i, stored on a broadcast medium, wherein the first location includes a decryption device, having an associated hardware identifier j, for decrypting the application program $S_i$ from the broadcast medium, the method comprising:

A. transmitting the hardware identifier j, the program identifier i, and a payment authorization from the first location to the second location;

B. generating a program identifier-program encryption key table for storage at the second location;

C. generating a hardware identifier-password key table for storage at the second location;

D. responsive to receipt of a program identifier at the second location, retrieving a program encryption key $SK_i$ associated with the identifier and secured against unauthorized access, from the program identifier-program encryption key table;

E. responsive to receipt at the second location of a hardware identifier, retrieving a password key $PK_j$ associated with the hardware identifier from the hardware identifier-password key table;

F. generating a password $P_{ij}$ by encrypting the software encryption key $SK_i$ with an encryption algorithm E;

G. transmitting the password $P_{ij}$ to the first location; and

H. decrypting the application program $S_i$ using the password $P_{ij}$ to activate the decryption device.

8. The method of claim 7, wherein Step C further comprises, using the program identifier i as an index to the program identifier-program encryption key table.

9. The method of claim 7, wherein Step E further comprises, using the hardware identifier j as an index to the hardware identifier-password key table.

10. Apparatus for controllably decrypting software distributed within a broadcast medium, including:

software encrypted using a software encryption algorithm related to a software encryption key $SK_i$ and a program identifier i, the apparatus comprising:

A. a first storage means for storing a password key $PK_j$;

B. a first decryption block for generating the software encryption key $SK_i$ using the password key $PK_j$ retrieved from the first storage means;

C. a second decryption block for decrypting the software retrieved from the broadcast medium using the software encryption key $SK_i$ retrieved from the first decryption block; and D. means, in communication with the first decryption block, for securing the software encryption key $SK_i$ against unauthorized access.

11. The apparatus of claim 10, wherein the password key $PK_j$ includes a hardware identifier j component, the system further comprising means for preventing arithmetic computation of the password key $PK_j$ based on the hardware identifier j.

12. A system for controllably authorizing access to distributed software, including:

a decryption device having an associated unique hardware identifier j, the system comprising:

A. first storage means for storing an encrypted authorization code $A_i^E$ encrypted using an encryption algorithm related to the hardware identifier j;

B. a number generator, in communication with the software, for generating a unique identifier RN associated with the software;

C. second storage means in communication with the software, for storing an authorization code $A_i'$;

D. third storage means for storing a password key $PK_j$;

E. a first decryption block for decrypting the authorization code $A_i^E$ using the password key $PK_j$ retrieved from the third storage means;

F. a challenge block for generating a first message digest MD using the unique identifier RN retrieved from the number generator and the decrypted authorization code retrieved from the first decryption block;

G. means for generating a second message digest MD' using the unique identifier RN retrieved from the number generator and the authorization code $A_i'$ retrieved from the first storage means; and H. means for authorizing access to the software based on a positive correlation between the first message digest MD and the second message digest MD'.

13. The system of claim 12, wherein the number generator generates a random number.

14. The system of claim 12, wherein the means for generating a second message digest MD' is in communication with the software.

15. The system of claim 12, wherein the challenge block comprises means for generating the first message digest MD using a non-reversible function applied to the unique identifier and the decrypted authorization code $A_i$.

16. The system of claim 12, wherein the software is encrypted using a software encryption algorithm related to a software encryption key $SK_i$ and a program identifier i, the system further comprising:

(i) a first storage means for storing a password key $PK_j$;

(ii) a first decryption block for generating the software encryption key $SK_i$ using the password key $PK_j$ retrieved from the first storage means;

(iii) a second decryption block for decrypting the software retrieved from the broadcast medium using the software encryption key $SK_i$ retrieved from the first decryption block; and (iv) means, in communication with the first decryption block, for securing the software encryption key $SK_i$ against unauthorized access.

17. The system of claim 16, wherein the password key $PK_j$ includes a hardware identifier j component, the system further comprising means for preventing arithmetic computation of the password key $PK_j$ based on the hardware identifier j.

18. A system for controllably decrypting software distributed within a broadcast medium, including:

(i) a first storage means for storing a password key $PK_j$;

(ii) a first decryption block for generating a software encryption key $SK_i$ using the password key $PK_j$ retrieved from the first storage means;

(iii) a second decryption block for decrypting the software retrieved from the broadcast medium using the software encryption key $SK_i$ retrieved from the first decryption block; and (iv) means, in communication with the first decryption block, for securing the software encryption key $SK_i$ against unauthorized access.

19. The system of claim 18, including a decryption device having an associated unique hardware identifier j, wherein the means for securing the software encryption key $SK_i$ further comprises:

A. first storage means for storing an encrypted authorization code $A_{ij}^E$ encrypted using an encryption algorithm related to the hardware identifier j;

B. a number generator, in communication with the software, for generating a unique identifier RN associated with the software;

C. second storage means in communication with the software, for storing an authorization code $A_i'$;

D. third storage means for storing a password key $PK_j$;

E. a first decryption block for decrypting the authorization code $A_i^E$ using the password key $PK_j$ retrieved from the third storage means;

F. a challenge block for generating a first message digest MD using the unique identifier RN retrieved from the number generator and the decrypted authorization code retrieved from the first decryption block;

G. means for generating a second message digest MD' using the unique identifier RN retrieved from the number generator and the authorization code $A_i'$ retrieved from the first storage means; and H. means for authorizing access to the software based on a positive correlation between the first message digest MD and the second message digest MD'.

* * * * *